United States Patent
Izawa et al.

(10) Patent No.: US 11,879,065 B2
(45) Date of Patent: Jan. 23, 2024

(54) ACTINIC RADIATION CURABLE INK AND IMAGE FORMING METHOD

(71) Applicant: Konica Minolta, Inc., Tokyo (JP)

(72) Inventors: Kouji Izawa, Tokyo (JP); Yasuaki Tsuji, Kanagawa (JP)

(73) Assignee: KONICA MINOLTA, INC., Tokyo (JP)

( * ) Notice: Subject to any disclaimer, the term of this patent is extended or adjusted under 35 U.S.C. 154(b) by 243 days.

(21) Appl. No.: 16/691,336

(22) Filed: Nov. 21, 2019

(65) Prior Publication Data
US 2020/0190343 A1 Jun. 18, 2020

(30) Foreign Application Priority Data

Dec. 17, 2018 (JP) .................................. 2018-235339

(51) Int. Cl.
*C09D 11/12* (2006.01)
*C09D 11/101* (2014.01)
*B41M 7/00* (2006.01)

(52) U.S. Cl.
CPC ......... *C09D 11/101* (2013.01); *B41M 7/0081* (2013.01); *C09D 11/12* (2013.01)

(58) Field of Classification Search
CPC ....... C09D 11/34; C09D 11/12; B41J 11/0015
See application file for complete search history.

(56) References Cited

U.S. PATENT DOCUMENTS

| | | | |
|---|---|---|---|
| 2010/0122642 A1* | 5/2010 | Farrugia ................ | C09D 11/34 977/902 |
| 2011/0244383 A1* | 10/2011 | Yamamoto ........... | G03G 9/0806 430/108.4 |
| 2012/0086761 A1* | 4/2012 | Chrítéen et al. ....... | C09D 11/34 347/88 |
| 2012/0224011 A1* | 9/2012 | Chretien ................ | C09D 11/34 522/66 |

(Continued)

FOREIGN PATENT DOCUMENTS

| | | |
|---|---|---|
| JP | 2012082417 A | 4/2012 |
| JP | 2016117807 A | 6/2016 |

OTHER PUBLICATIONS

EPO, Extended European Search Report for the corresponding European patent application No. 19214750.2, dated Apr. 29, 2020.

(Continued)

*Primary Examiner* — Lam S Nguyen

(74) *Attorney, Agent, or Firm* — LUCAS & MERCANTI, LLP

(57) ABSTRACT

The actinic radiation curable inkjet ink of the present invention includes an actinic radiation polymerizable compound, a crystalline polyester resin, and a gelling agent selected from the group consisting of aliphatic ester-based wax, aliphatic ketone-based wax, paraffin wax and microcrystalline wax. The image forming method of the present invention includes ejecting the actinic radiation curable inkjet ink heated to 40 to 120° C. through an inkjet head to land the actinic radiation curable inkjet ink ejected, onto a surface of a recording medium or an intermediate transfer (Continued)

member whose surface temperature is 60° C. or less, and irradiating the actinic radiation curable inkjet ink landed with actinic radiation.

12 Claims, 1 Drawing Sheet

(56) References Cited

U.S. PATENT DOCUMENTS

| | | | |
|---|---|---|---|
| 2014/0002534 A1* | 1/2014 | Maeda | B41J 11/0015 |
| | | | 347/17 |
| 2016/0139526 A1* | 5/2016 | Veregin | G03G 9/0827 |
| | | | 526/284 |
| 2016/0208118 A1* | 7/2016 | Takabayashi | B41J 11/00218 |
| 2018/0267416 A1* | 9/2018 | Uchino | G03G 9/08797 |

OTHER PUBLICATIONS

CNIPA, Office Action for the corresponding Chinese Patent Application No. 201911270129.3, dated Dec. 23, 2021, with English translation.

* cited by examiner

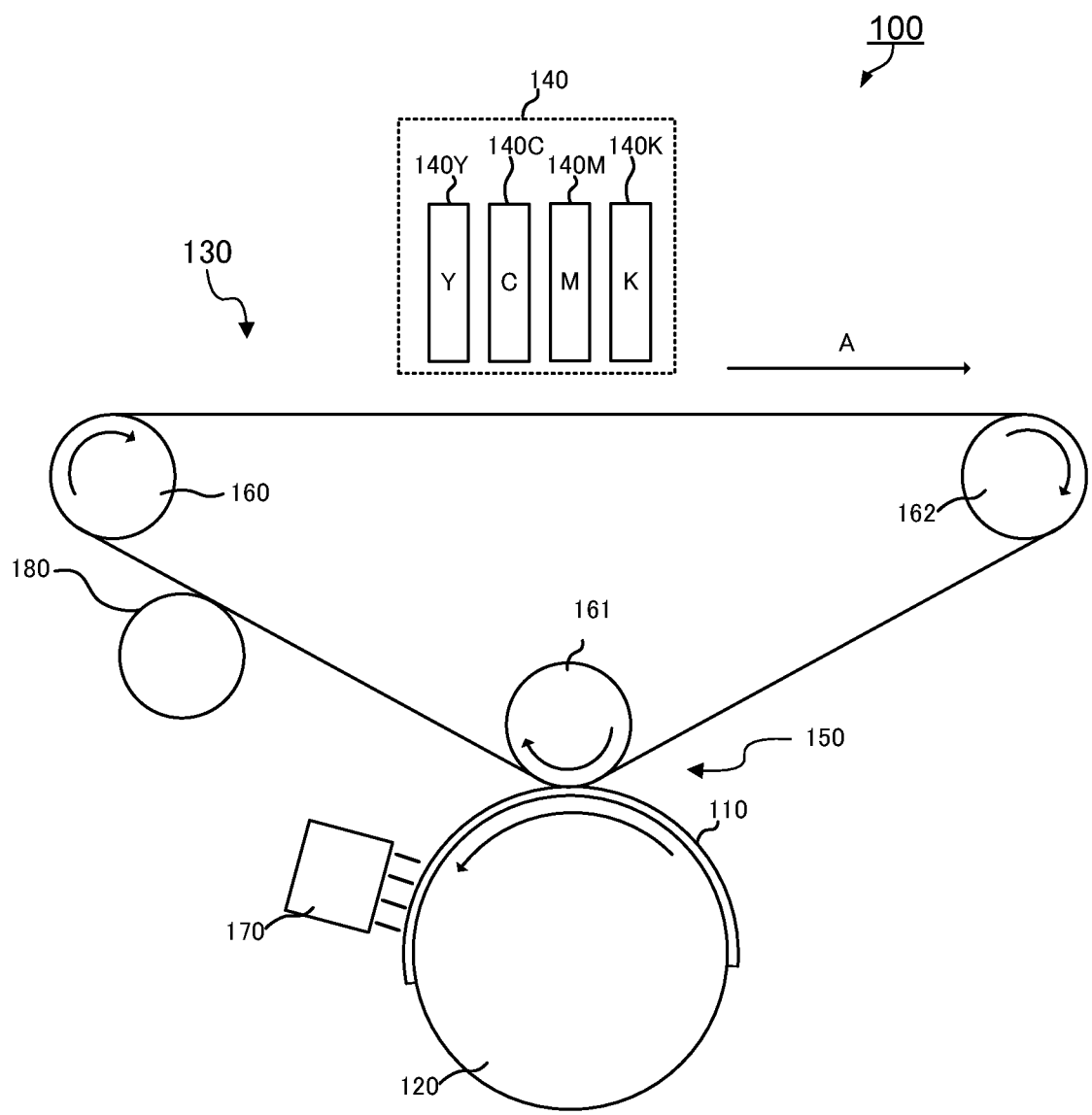

ACTINIC RADIATION CURABLE INK AND IMAGE FORMING METHOD

CROSS REFERENCE TO RELATED APPLICATIONS

The entire disclosure of Japanese Patent Application No. 2018-235339 filed on Dec. 17, 2018, is incorporated herein by reference in its entirety.

BACKGROUND

Technological Field

The present invention relates to an actinic radiation curable ink including a crystalline polyester resin, and an image forming method.

Description of Related Art

Inkjet methods can simply and inexpensively produce an image, and thus are applied to various printing fields including special printing such as a photograph, various printings, marking, and a color filter. In particular, inkjet methods are particularly suitable for applications where various images are formed in portions, because digital printing can be made without any plate.

There is known, as one inkjet ink, an ink (hereinafter, also simply referred to as an "actinic radiation curable ink") containing, as a liquid component, an actinic radiation polymerizable compound which is to be cured by irradiation with actinic radiation A droplet of such an actinic radiation curable ink is landed on the surface of a recording medium and the droplet landed is irradiated with actinic radiation, thereby forming a cured film obtained by curing of the droplet of the ink and aggregation of dots, on the surface of a recording medium. Such a cured film can be sequentially formed to result in formation of a desired image.

There is also known an actinic radiation curable ink including a crystalline polyester resin.

Japanese Patent Application Laid-Open No. 2012-082417 discloses a curable phase transition ink composition including an ink medium, at least one crystalline polyester resin, at least one wax, curable wax having at least one amide group, and at least one curable monomer. The Application describes the following: a base plate can be coated with the curable phase transition ink composition without any excessive penetration of the composition into the base plate because the ink composition includes wax and the composition is increased in viscosity by cooling of the composition after coating.

Japanese Patent Application Laid-Open No. 2016-117807 discloses an actinic energy radiation curable composition including a crystalline polyester which is formed from at least two polyvalent carboxylic acids and one or more polyhydric alcohols and in which one of the at least two polyvalent carboxylic acids is tri- or higher valent carboxylic acid. The Application describes the following: such a crystalline polyester synthesized from such two or more polyvalent carboxylic acids (one thereof is tri- or higher valent carboxylic acid) and such one or more polyhydric alcohols can be partially compatible with a photocurable compound.

The curable phase transition ink composition described in Japanese Patent Application Laid-Open No. 2012-082417 includes a crystalline polyester resin, and thus is considered to hardly cause ink separation and offset to occur in smoothing of the ink on an image base plate by contact with a roller or the like.

The actinic energy radiation curable composition described in Japanese Patent Application Laid-Open No. 2016-117807 includes a crystalline polyester resin, and thus is considered to allow favorable results with respect to curability, stretching properties, attachment properties, and the like of the composition to be obtained.

According to findings by the present inventors, however, when an image is formed using the curable phase transition ink composition described in Japanese Patent Application Laid-Open No. 2012-082417 and the actinic energy radiation curable composition described in Japanese Patent Application Laid-Open No. 2016-117807, an actinic radiation polymerizable compound is easily leaked from a dot formed by curing of the ink and a highly fine image is hardly formed.

SUMMARY

The present invention has been made in view of such circumstances, and an object thereof is to provide an actinic radiation curable inkjet ink, which enables leakage of an actinic radiation polymerizable compound from a dot to be suppressed, and an image forming method using the actinic radiation curable ink.

To achieve at least one of the abovementioned objects, according to an aspect of the present invention, an actinic radiation curable inkjet ink reflecting one aspect of the present invention comprises: an actinic radiation polymerizable compound; a crystalline polyester resin; and a gelling agent selected from the group consisting of aliphatic ester-based wax, aliphatic ketone-based wax, paraffin wax and microcrystalline wax.

To achieve at least one of the abovementioned objects, according to an aspect of the present invention, an image forming method reflecting one aspect of the present invention comprises: ejecting the actinic radiation curable inkjet ink according to any one of claims 1 to 10 heated to 40 to 120° C. through an inkjet head, to land the actinic radiation curable inkjet ink ejected, onto a surface of a recording medium or an intermediate transfer member whose surface temperature is 60° C. or less; and irradiating the actinic radiation curable inkjet ink landed with actinic radiation.

BRIEF DESCRIPTION OF DRAWINGS

The advantages and features provided by one or more embodiments of the invention will become more fully understood from the detailed description given hereinbelow and the appended drawing which are given by way of illustration only, and thus are not intended as a definition of the limits of the present invention:

FIG. 1 illustrates a schematic view illustrating an exemplary configuration of an inkjet image forming apparatus according to an embodiment of the present invention.

DETAILED DESCRIPTION OF EMBODIMENTS

Hereinafter, one or more embodiments of the present invention will be described with reference to the drawing. However, the scope of the invention is not limited to the disclosed embodiments.

[Actinic Radiation Curable Ink]

One embodiment of the present invention relates to an actinic radiation curable inkjet ink, the ink including an actinic radiation polymerizable compound, a crystalline polyester resin, and wax selected from the group consisting of aliphatic ester-based wax, aliphatic ketone-based wax, paraffin wax and microcrystalline wax. The crystalline polyester resin is preferably a styrene acrylic-modified polyester resin.

(Actinic Radiation Polymerizable Compound)

The actinic radiation polymerizable compound is a compound that is to be crosslinked or polymerized by irradiation with actinic radiation. Examples of the actinic radiation include electron beam, ultraviolet light, α-ray, γ-ray, and X-ray. In particular, the actinic radiation is preferably ultraviolet light or electron beam. Examples of the actinic radiation polymerizable compound include a cationic polymerizable compound, a radical polymerizable compound, or a mixture thereof. The actinic radiation polymerizable compound is preferably a radical polymerizable compound. The actinic radiation polymerizable compound may be any of a monomer, a polymerizable oligomer, a prepolymer, and a mixture thereof.

The radical polymerizable compound is a compound having an ethylenically unsaturated double bond group in its molecule. The radical polymerizable compound can be a monofunctional compound or a polyfunctional compound. Examples of the radical polymerizable compound include (meth)acrylate being an unsaturated carboxylate compound. In the present invention, the "(meth)acrylate" means acrylate or methacrylate, the "(meth)acryloyl group" means an acryloyl group or a methacryloyl group, and the "(meth)acrylic" means acrylic or methacrylic.

Examples of monofunctional (meth)acrylate include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxyethylhexahydrophthalic acid, butoxyethyl (meth)acrylate, ethoxydiethylene glycol (meth)acrylate, methoxydiethylene glycol (meth)acrylate, methoxy polyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethylsuccinic acid, 2-(meth)acryloyloxyethylphthalic acid, 2-(meth)acryloyloxyethyl-2-hydroxyethyl-phthalic acid, and t-butylcyclohexyl (meth)acrylate.

Examples of polyfunctional (meth)acrylate include difunctional (meth)acrylates such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, PO adduct di(meth)acrylate of bisphenol A, hydroxypivalic acid neopentyl glycol di(meth)acrylate, polytetramethylene glycol di(meth)acrylate, polyethylene glycol diacrylate and tripropylene glycol diacrylate; trifunctional (meth)acrylates such as trimethylolpropane tri(meth)acrylate and pentaerythritol tri(meth)acrylate; tri- or higher functional (meth)acrylates such as pentaerythritol tetra(meth)acrylate, dipentaerythritol hexa(meth)acrylate, ditrimethylolpropane tetra(meth)acrylate, glycerin propoxy tri(meth)acrylate and pentaerythritol ethoxy tetra(meth)acrylate; and oligomers having a (meth)acryloyl group, including polyester acrylate oligomers, and modified products thereof. Examples of such a modified product include ethylene oxide-modified (EO-modified) acrylate into which an ethylene oxide group is introduced, and propylene oxide-modified (PO-modified) acrylate into which propylene oxide is introduced.

The cationic polymerizable compound is a compound having a cationic polymerizable group in its molecule. Examples of the cationic polymerizable compound include an epoxy compound, a vinyl ether compound, and an oxetane compound.

Examples of the epoxy compound include alicyclic epoxy resins such as 3,4-epoxycyclohexylmethyl-3',4'-epoxycyclohexane carboxylate, bis(3,4-epoxycyclohexylmethyl)adipate, vinylcyclohexene monoepoxide, ε-caprolactone-modified 3,4-epoxycyclohexylmethyl 3',4'-epoxycyclohexane carboxylate, 1-methyl-4-(2-methyloxiranyl)-7-oxabicyclo[4,1,0] heptane, 2-(3,4-epoxycyclohexyl-5,5-spiro-3,4-epoxy)cyclohexanone-meta-dioxane and bis(2,3-epoxycyclopentyl)ether, aliphatic epoxy compounds including 1,4-butanediol diglycidyl ether, 1,6-hexanediol diglycidyl ether, glycerin triglycidyl ether, trimethylolpropane triglycidyl ether, polyethylene glycol diglycidyl ether, propylene glycol diglycidyl ether, and polyether polyol polyglycidyl ethers obtained by adding one or more alkylene oxides (ethylene oxide, propylene oxide, and the like) to aliphatic polyhydric alcohols such as ethylene glycol, propylene glycol and glycerin, and aromatic epoxy compounds including di- or polyglycidyl ether of bisphenol A or an alkylene oxide adduct thereof, di- or polyglycidyl ether of hydrogenated bisphenol A or an alkylene oxide adduct thereof, and a novolac type epoxy resin.

Examples of the vinyl ether compound include monovinyl ether compounds including ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether and octadecyl vinyl ether, and di- or trivinyl ether compounds including ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether.

Examples of the oxetane compound include 3-hydroxymethyl-3-methyloxetane, 3-hydroxymethyl-3-ethyloxetane, 3-hydroxymethyl-3-propyloxetane, 3-hydroxymethyl-3-n-butyloxetane, 3-hydroxymethyl-3-phenyloxetane, 3-hydroxymethyl-3-benzyloxetane, 3-hydroxyethyl-3-methyloxetane, 3-hydroxyethyl-3-ethyloxetane, 3-hydroxyethyl-3-propyloxetane, 3-hydroxyethyl-3-phenyloxetane, 3-hydroxypropyl-3-methyloxetane, 3-hydroxypropyl-3-ethyloxetane, 3-hydroxypropyl-3-propyloxetane, 3-hydroxypropyl-3-phenyloxetane, 3-hydroxybutyl-3-methyloxetane, 1,4-bis{[(3-ethyl-3-oxetanyl)methoxy]methyl}benzene, 3-ethyl-3-(2-ethylhexyloxymethyl)oxetane, and di[1-ethyl(3-oxetanyl)]methyl ether.

The content of the actinic radiation polymerizable compound is, for example, preferably 1 wt % or more and 97 wt % or less, more preferably 30 wt % or more and 90 wt % or less based on the total mass of the actinic radiation curable ink.

(Wax)

The wax is an organic substance that is a solid at ordinary temperature and can be formed into a liquid by heating to thereby allow the actinic radiation curable ink to undergo sol-gel phase transition according to the variation in temperature.

The wax is preferably crystallized in the ink at a temperature equal to or lower than the gelation temperature of the ink. The gelation temperature here refers to a temperature at which the viscosity of the ink is rapidly varied by phase transition of the ink from sol to gel during cooling of the ink formed into sol or liquefied by heating. Specifically, the gelation temperature can be determined as the gelation temperature of the ink, at which the viscosity is rapidly increased during cooling of the ink formed into sol or liquefied, with measuring of the viscosity by a rheometer (for example, Physica MCR300 manufactured by Anton Paar GmbH).

When the wax is crystallized in the ink, the actinic radiation polymerizable compound may be surrounded in a three-dimensional space formed by the wax crystallized in a plate shape (hereinafter, such a structure is referred to as "card house structure"). Formation of such a card house structure allows the actinic radiation polymerizable compound in the form of a liquid to be retained in the space, thereby allowing a dot formed by landing of the ink to be further hardly wetted and spread, resulting in a more enhancement in pinning properties of the ink. Such an enhancement in pinning properties of the ink allows a dot formed by landing of the ink onto a recording medium to be hardly combined.

The wax is preferably crystallized prior to crystallization of the crystalline polyester resin from the viewpoint of an enhancement in pinning properties. Specifically, the wax is preferably a compound higher in crystallization temperature than the crystalline polyester resin.

The wax is preferably wax low in polarity, such wax hardly interacting with the actinic radiation polymerizable compound and the crystalline polyester resin, in order to enhance crystallinity.

Examples of the wax low in polarity include aliphatic ketone wax, aliphatic ester wax, paraffin wax, and microcrystalline wax. The wax may be used singly or is preferably used in combinations of two or more kinds thereof. Such wax hardly interacts with the actinic radiation polymerizable compound and the crystalline polyester resin, unlike curable wax including a curable amide component described in Japanese Patent Application Laid-Open No. 2012-082417, and thus can easily undergo gelation even when compounded into the ink including the crystalline polyester resin, and can allow pinning properties of the ink to be maintained.

The aliphatic ester wax refers to wax having an ester group represented by the following formula (1). The number of ester group(s) included in the molecule forming the ester wax is not particularly limited, and is preferably one;

$$R_1\text{—}(C\text{=}O)\text{—}O\text{—}R_2 \qquad \text{Formula (1)}$$

wherein $R_1$ and $R_2$ each independently represent a saturated or unsaturated hydrocarbon group having 17 to 25 carbon atoms.

Examples of the aliphatic ester wax include behenyl behenate, icosyl icosanoate, stearyl stearate, palmityl stearate, cetyl palmitate, myristyl myristate, cetyl myristate, myricyl cerotate, stearyl stearate, oleyl palmitate, glycerin fatty acid ester, sorbitan fatty acid ester, propylene glycol fatty acid ester, ethylene glycol fatty acid ester, and polyoxyethylene fatty acid ester.

The aliphatic ketone wax refers to wax having a ketone group represented by the following formula (2). The number of ketone group(s) included in the molecule forming the ketone wax is not particularly limited, and is preferably one;

$$R_3\text{—}(C\text{=}O)\text{—}R_4 \qquad \text{Formula (2)}$$

wherein $R_3$ and $R_4$ each independently represent a saturated or unsaturated hydrocarbon group having 17 to 25 carbon atoms.

Examples of the aliphatic ketone wax include dilignoceryl ketone, dibehenyl ketone, distearyl ketone, dieicosyl ketone, dipalmityl ketone, dilauryl ketone, dimyristyl ketone, myristylpalmityl ketone, and palmitylstearyl ketone.

The paraffin here means any alkane having 20 or more carbon atoms (linear saturated hydrocarbon of general formula $C_nH_{2n+2}$), and, in the present embodiment, the paraffin wax refers to a mixture of hydrocarbons each containing a linear paraffin-based hydrocarbon (normal-paraffin) having 20 or more and 40 or less carbon atoms, as a main component, and a small amount of isoparaffin, and having a molecule weight of about 300 to 500.

Examples of the paraffin wax include Paraffin Wax-155, Paraffin Wax-135, Paraffin Wax-115, HNP-3, HNP-9, HNP-11, SP-0165, SP-1039, and SP-3040 (all manufactured by Nippon Seiro Co., Ltd.).

The microcrystalline wax means wax mainly extracted from a residue oil content resulting from distillation at a reduced pressure, of crude oil, and means wax containing a branched hydrocarbon (isoparaffin) and/or a saturated cyclic hydrocarbon (cycloparaffin). The microcrystalline wax contains low-crystalline isoparaffin and/or cycloparaffin in large amount(s), and thus is small in the size of crystal and high in molecule weight as compared with the paraffin wax.

The microcrystalline wax has 30 to 60 carbon atoms, a weight average molecular weight (Mw) of 500 to 800, and a melting point of 60 to 90° C. The microcrystalline wax preferably has a weight average molecular weight (Mw) of 600 to 800 and a melting point of 60 to 85° C. Such microcrystalline wax having a low molecule weight, in particular, such microcrystalline wax having a number average molecular weight (Mw) of 300 to 1000 is preferable, and such microcrystalline wax having a number average molecular weight of 400 to 800 is more preferable. The ratio (Mw/Mn) of the number average molecular weight (Mw) to the weight average molecular weight (Mw) is preferably 1.01 to 1.20.

Examples of the microcrystalline wax include Hi-MiC-1045, Hi-MiC-1070, Hi-MiC-1080, Hi-MiC-1090, Hi-MiC-2045, Hi-MiC-2065, Hi-MiC-2095, EMW-0001, and EMW-0003 (all manufactured by Nippon Seiro Co., Ltd.).

The wax is preferably wax being an aliphatic ester or aliphatic ketone having a linear alkyl group having 12 or more and 25 or less carbon atoms, from the viewpoint of a more enhancement in pinning properties of the ink. The aliphatic ester or aliphatic ketone may have a structure where only one of two carbon chains sandwiching the ketone group or ester group is a linear alkyl group having 12 or more and 25 or less carbon atoms, and preferably has a structure where both the two carbon chains are each a linear alkyl group satisfying the requirement about the number of carbon atoms, from the viewpoint that the above effect is more easily exerted. The number of carbon atoms is 12 or more, thereby resulting in a more enhancement in crystallinity of the wax. Thus, it is considered that pinning properties of the ink are more enhanced. It is also considered that the number of carbon atoms is 25 or less, thereby resulting in an improvement in ejecting properties of the ink.

Examples of the aliphatic ester having a linear alkyl group having 12 or more and 25 or less carbon atoms include behenyl behenate (number of carbon atoms: 21-22), icosyl icosanoate (number of carbon atoms: 19-20), behenyl stearate (number of carbon atoms: 17-21), stearyl stearate (number of carbon atoms: 17-18), palmityl stearate (number of carbon atoms: 17-16), lauryl stearate (number of carbon atoms: 17-12), cetyl palmitate (number of carbon atoms: 15-16), stearyl palmitate (number of carbon atoms: 15-18), myristyl myristate (number of carbon atoms: 13-14), cetyl myristate (number of carbon atoms: 13-16), octyldodecyl myristate (number of carbon atoms: 13-20), stearyl oleate (number of carbon atoms: 17-18), stearyl erucate (number of carbon atoms: 21-18), stearyl linoleate (number of carbon atoms: 17-18), behenyl oleate (number of carbon atoms: 18-22) and arachidyl linoleate (number of carbon atoms: 17-20). The number of carbon atoms in parentheses represents the number of carbon atoms in each of two hydrocarbon groups divided by an ester group.

Examples of the aliphatic ketone having a linear alkyl group having 12 or more and 25 or less carbon atoms include dilignoceryl ketone (number of carbon atoms: 23-23), dibehenyl ketone (number of carbon atoms: 21-21), distearyl ketone (number of carbon atoms: 17-17), dieicosyl ketone (number of carbon atoms: 19-19), dipalmityl ketone (number of carbon atoms: 15-15), dimyristyl ketone (number of carbon atoms: 13-13), lauryl myristyl ketone (number of carbon atoms: 11-14), lauryl palmityl ketone (11-16), myristyl palmityl ketone (13-16), myristyl stearyl ketone (13-18), myristyl behenyl ketone (13-22), palmityl stearyl ketone (15-18), palmityl behenyl ketone (15-22) and stearyl behenyl ketone (17-22). The number of carbon atoms in parentheses represents the number of carbon atoms in each of two hydrocarbon groups divided by a carbonyl group.

The content of the wax is preferably 0.01 wt % or more and 7.0 wt % or less based on the total mass of the ink, more preferably 0.2 wt % or more and 6.8 wt % or less based on the total mass of the ink. The content of the wax falls within the range, thereby enabling pinning properties of the ink to be sufficiently enhanced and enabling a more highly fine image to be formed.

The wax is preferably low in compatibility with the actinic radiation polymerizable compound to be used (a high value of HSP distance (Ra)). The HSP distance (Ra) between the wax and the actinic radiation polymerizable compound is preferably 11 or more and 19 or less. The reason is because pinning properties are enhanced even in the case of a small amount of the wax compounded.

The "HSP distance (Ra)" means the distance between components of the Hansen solubility parameter (HSP value). The Hansen solubility parameter (HSP value) is treated as a three-dimensional vector by division of the solubility parameter (SP value) into three terms of a dispersion term (dD), a polarity term (dP), and a hydrogen bond term (dH). The HSP value unique to a substance is defined by the following expression, and the idea proposed by Hansen is described in "Kagaku Kogyo, March 2010, published by Kagaku Kogyo Sha, edited by Hiroshi Yamamoto, Steven Abbott, Charles M. Hansen".

$$\text{HSP value} = (dD^2 + dP^2 + dH^2)^{1/2}$$

dD: dispersion term
dP: polarity term
dH: hydrogen bond term

The HSP value which can be used is any value of the database included in a computational software "Hansen Solubility Parameters in Practice (HSPiP) Version 4.1.03" (attributed to Steven Abbott, Charles M. Hansen, and Hiroshi Yamamoto). The HSP value of the wax can be calculated using the computational software by inputting the chemical structural formula of the wax. Herein, the HSP value of hydrocarbon wax can be a value obtained by inputting the structure of a linear alkane whose weight average molecular weight is closest to the weight average molecular weight of the hydrocarbon wax, to the computational software.

The HSP distance (Ra) between two compounds can be determined by the following expression. In the following expression, the dispersion term, the polarity term, and the hydrogen bond term with respect to one component of two components for determining the HSP distance are defined as dD, dP, and dH, respectively, and the dispersion term, the polarity term, and the hydrogen bond term with respect to the other component thereof are defined as dD', dP', and dH', respectively.

$$\text{HSP distance} = (4 \times (dD-dD')^2 + (dP-dP')^2 + (dH-dH')^2)^{1/2}$$

When the actinic radiation curable ink includes a plurality of compounds in components of the wax, the actinic radiation polymerizable compound, the crystalline polyester, and the like, the respective weighted average values of the dispersion terms, the polarity terms, and the hydrogen bond terms with respect to such a plurality of compounds included, at the molar ratio of such a plurality of compounds included in the components, are defined as the dispersion term, the polarity term, and the hydrogen bond term of the components.

The wax preferably does not substantially include an actinic radiation polymerizable functional group. The phrase "not substantially include" means that the amount of such an actinic radiation polymerizable functional group per mol of the wax is 0.1 molar equivalents or less. It is considered that such an actinic radiation polymerizable functional group in the wax is not substantially included and thus inhibition of polymerization and crosslinking of the actinic radiation polymerizable compound by such a functional group in the wax hardly occurs, thereby enabling the crosslinking density to be sufficiently enhanced. Such an actinic radiation polymerizable functional group in the wax is not substantially included and thus the occurrence of ejection bending can be suppressed which is due to crosslinking and fixing of the wax attached to the nozzle surface with weak energy of actinic radiation reflected in an apparatus.

(Crystalline Polyester Resin)

The crystalline polyester resin is a crystalline resin obtained by a polycondensation reaction of a di- or higher valent carboxylic acid (polyvalent carboxylic acid compound) and a di- or higher hydric alcohol (polyhydric alcohol compound).

The polyvalent carboxylic acid compound is a compound having two or more carboxy groups in one molecule, and alkyl ester, acid anhydride, and acid chloride of the polyvalent carboxylic acid compound can be used.

Examples of the polyvalent carboxylic acid compound include divalent aliphatic carboxylic acids such as oxalic acid, succinic acid, malonic acid, adipic acid, β-methyladipic acid, pimelic acid, azelaic acid, sebacic acid, nonanedicarboxylic acid, decanedicarboxylic acid, undecanedicarboxylic acid, dodecanedicarboxylic acid, maleic acid, fumaric acid, citraconic acid, diglycolic acid, cyclohexane-3,5-diene-1,2-dicarboxylic acid, malic acid, citric acid, hexahydroterephthalic acid, tartaric acid and mucic acid; divalent aromatic carboxylic acids such as phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediglycolic acid, p-phenylenediglycolic acid, o-phenylenediglycolic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and dodecenyl succinic acid; and tri- or higher valent aromatic carboxylic acids such as trimellitic acid, pyromellitic acid, naphthalenetricarboxylic acid, naphthalenetetracarboxylic acid, pyrenetricarboxylic acid and pyrenetetracarboxylic acid.

The polyvalent carboxylic acid compound is preferably a divalent aliphatic carboxylic acid from the viewpoint of an enhancement in crystalline of the crystalline polyester resin. The polyvalent carboxylic acid compound may be used singly or in combinations of two or more kinds thereof.

The polyhydric alcohol compound is a compound having two or more hydroxy groups in one molecule.

Examples of the polyhydric alcohol compound include dihydric linear aliphatic alcohols such as ethylene glycol, propylene glycol, butanediol, diethylene glycol, hexanediol, octanediol, decanediol and dodecanediol; dihydric alicyclic alcohols such as cyclohexanediol; dihydric aromatic alcohols such as an ethylene oxide adduct of bisphenol A and a propylene oxide adduct of bisphenol A; tri- or higher hydric aliphatic alcohols such as glycerin and pentaerythritol; and tri- or higher hydric alcohols having a guanidine backbone, such as hexamethylolmelamine, tetramethylol benzoguanamine and tetraethylol benzoguanamine.

The polyhydric alcohol compound is preferably a dihydric aliphatic alcohol, more preferably a dihydric linear aliphatic alcohol from the viewpoint of an enhancement in crystallinity of the crystalline polyester resin. The polyhydric alcohol compound may be used singly or in combinations of two or more kinds thereof.

The ratio of the polyhydric alcohol compound and the polyvalent carboxylic acid compound in the monomer for synthesis of the crystalline polyester resin is preferably 2.0/1.0 to 1.0/2.0, more preferably 1.5/1.0 to 1.0/1.5 in terms of the equivalent ratio [OH]/[COOH] of the hydroxy group [OH] of the polyhydric alcohol compound and the carboxy group [COOH] of the polyvalent carboxylic acid compound.

Examples of a specific combination of the polyvalent carboxylic acid compound and the polyhydric alcohol compound, for formation of the crystalline polyester resin, include combinations of 1,12-dodecanediol (number of carbon atoms: 12) and succinic acid (number of carbon atoms: 4), 1,12-dodecanediol (number of carbon atoms: 12) and sebacic acid (number of carbon atoms: 10), ethylene glycol (number of carbon atoms: 2) and sebacic acid (number of carbon atoms: 10), 1,6-hexanediol (number of carbon atoms: 6) and sebacic acid (number of carbon atoms: 10), 1,6-hexanediol (number of carbon atoms: 6) and decanedicarboxylic acid (number of carbon atoms: 12), 1,9-nonanediol (number of carbon atoms: 9) and decanedicarboxylic acid (number of carbon atoms: 12), and ethylene glycol (number of carbon atoms: 2) and dodecanedicarboxylic acid (number of carbon atoms: 14).

One compound in the combination of the polyvalent carboxylic acid compound and the polyhydric alcohol compound is preferably a compound having a longer carbon chain from the viewpoint that compatibility with the actinic radiation polymerizable compound is properly suppressed to sufficiently crystallize the crystalline polyester. One compound in the combination of the polyvalent carboxylic acid compound and the polyhydric alcohol compound is preferably a compound having a longer carbon chain from the viewpoint that compatibility with the wax is properly suppressed to sufficiently crystallize the crystalline polyester.

The combination of the polyvalent carboxylic acid compound and the polyhydric alcohol compound is preferably a combination of a compound having 10 or more carbon atoms and a compound having less than 10 carbon atoms from such viewpoints. Examples of such a combination include combinations of 1,12-dodecanediol (number of carbon atoms: 12) and succinic acid (number of carbon atoms: 4), and ethylene glycol (number of carbon atoms: 2) and dodecanedicarboxylic acid (number of carbon atoms: 14).

The crystalline polyester resin is high in affinity with the actinic radiation polymerizable compound. The crystalline polyester resin high in such affinity is crystallized in the state of incorporating the actinic radiation polymerizable compound, in injection of the ink and landing of the ink onto a recording medium or an intermediate transfer member. Thus, the crystalline polyester resin can suppress leakage of the actinic radiation polymerizable compound from a dot formed by landing of the ink. Thus, the crystalline polyester resin can, for example, inhibit neighboring dots from being combined due to contact of the actinic radiation polymerizable compound leaked from neighboring dots on a recording medium or an intermediate transfer member, thereby allowing a highly fine image less in color bleeding to be formed.

The reason why the effect of suppressing leakage of the actinic radiation polymerizable compound, by the crystalline polyester resin, is exerted is considered because the wax and the crystalline polyester resin are separately crystallized to thereby form a complicatedly entangled crystal structure and thus fix a crystal of the crystalline polyester resin by a crystal of the wax. On the contrary, the reason why the effect of suppressing leakage of the actinic radiation polymerizable compound is not sufficiently exerted is considered because an actinic radiation curable ink containing no wax causes a crystal of the crystalline polyester resin to flow on a recording medium or an intermediate transfer member.

Such leakage of the actinic radiation polymerizable compound particularly easily occurs in use of a resin film low in ink absorption properties as a recording medium. Thus, the effect of suppressing leakage of the actinic radiation polymerizable compound, by the crystalline polyester resin, is remarkably exerted in use of a resin film as a recording medium.

The crystalline polyester resin can also more enhance pinning properties of the actinic radiation curable ink due to crystallization on the recording medium or the intermediate transfer member.

The crystalline polyester resin and the actinic radiation polymerizable compound result in an enhancement in internal aggregation force of the actinic radiation curable ink due to the high affinity therebetween. As a result, the crystalline polyester resin inhibits scattering (satellites) of fine droplets from the actinic radiation curable ink injected in injection of the ink from occurring. Thus, the fine droplets can be inhibited from being scattered around a position where the ink is landed, thereby enabling a highly fine image less in image variation to be formed.

The content of the crystalline polyester resin is preferably 0.1 to 10.0 wt %, more preferably 0.2 to 6.0 wt % based on the total mass of the ink. The crystalline polyester resin is contained at a content of 0.1 wt % or more, resulting in a sufficient enhancement in internal aggregation force of the ink due to affinity between the actinic radiation polymerizable compound and the crystalline polyester resin included in the ink, thereby enabling satellites occurring in injection of the ink to be suppressed. The content of the crystalline polyester resin is 10.0 wt % or less, thereby enabling deterioration in ejecting properties of the ink due to an excessively enhanced internal aggregation force of the ink to be suppressed.

The content of the crystalline polyester resin based on the total mass of the ink is preferably higher than the content of the wax, and is preferably higher than the content of the wax by 0.1 to 8.0 wt %, more preferably by 0.2 to 6.0 wt %. The content of the crystalline polyester resin can be higher than the content of the wax, thereby allowing a crystal structure of the crystalline polyester resin to be sufficiently formed, resulting in a more enhancement in the effect of suppressing leakage of the actinic radiation polymerizable compound.

(Styrene Acrylic-Modified Polyester Resin)

The crystalline polyester resin is preferably a styrene acrylic-modified polyester resin. The styrene acrylic-modified polyester resin refers to a resin where a crystalline polyester segment formed from a polyester resin and a styrene acrylic segment formed from a styrene acrylic copolymer are bound via a bireactive compound. The crystalline polyester segment refers to an aggregate of a structural unit derived from the crystalline polyester resin in the styrene acrylic-modified polyester resin. The styrene acrylic segment refers to an aggregate of a structural unit derived from the styrene acrylic in the styrene acrylic-modified polyester resin.

The crystalline polyester resin can be subjected to styrene acrylic modification, thereby allowing the actinic radiation polymerizable compound to be confined in a steric structure formed by an aromatic ring derived from a styrene-based monomer. Here, the actinic radiation polymerizable compound is trapped by a constituent unit derived from a (meth)acrylic acid-based monomer high in affinity with the actinic radiation polymerizable compound, near the aromatic ring. Thus, leakage of the actinic radiation polymerizable compound can be more effectively suppressed.

The styrene acrylic-modified polyester resin can also be obtained by performing a polymerization reaction for production of a styrene acrylic resin, in the presence of a crystalline polyester resin prepared in advance, or performing a polymerization reaction for production of a crystalline polyester resin, in the presence of a styrene acrylic resin prepared in advance.

The bireactive compound is a compound having a substituent that can react with both the crystalline polyester segment and the styrene acrylic segment, and a polymerizable unsaturated group. Examples of the bireactive compound include (meth)acrylic acid, fumaric acid, maleic acid, and maleic anhydride.

The styrene-based monomer that is a component included in the styrene acrylic copolymer is a monomer including a styrene structure and having an ethylenically unsaturated bond that can perform radical polymerization. Examples of the styrene-based monomer include styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene, 3,4-dichlorostyrene, and derivatives thereof. The styrene-based monomer may be used singly or in combinations of two or more kinds thereof.

The (meth)acrylic acid-based monomer that is a component included in the styrene acrylic copolymer is a monomer containing a (meth)acrylic group and having an ethylenically unsaturated bond that can perform radical polymerization. Examples of the acrylic acid-based monomer include acrylic acid, methacrylic acid, methyl acrylate, ethyl acrylate, butyl acrylate, 2-ethylhexyl acrylate, cyclohexyl acrylate, phenyl acrylate, ethyl 3-hydroxyacrylate, propyl γ-aminoacrylate and ethylene glycol, diacrylates of dihydric alcohols such as propylene glycol, butylene glycol and hexylene glycol, and dimethacrylates or trimethacrylates of tri- or higher hydric alcohols such as pentaerythritol and trimethylolpropane. Examples of the methacrylic acid-based compound include methyl methacrylate, ethyl methacrylate, butyl methacrylate, hexyl methacrylate, 2-ethylhexyl methacrylate, stearyl methacrylate, dimethylaminoethyl methacrylate, and diethylaminoethyl methacrylate. The (meth)acrylic acid-based monomer may be used singly or in combinations of two or more kinds thereof. When any (meth)acrylic acid-based monomer that can also act as the bireactive compound, such as acrylic acid or methacrylic acid, is used, it is not necessary to use any bireactive compound separate from the (meth)acrylic acid-based monomer in synthesis of the styrene acrylic-modified polyester resin.

Any other polymerizable compound can also be used in synthesis of the styrene acrylic copolymer. Examples of such other polymerizable compound that can be used include a monofunctional vinyl monomer and a polyfunctional vinyl monomer. Examples of the monofunctional vinyl monomer include acid monomers such as maleic anhydride and vinyl acetic acid, acrylamide, methacrylamide, acrylonitrile, ethylene, propylene, butylene vinyl chloride, and N-vinylpyrrolidone.

Examples of the polyfunctional vinyl monomer include butadiene and divinyl benzene.

The styrene acrylic copolymer can be obtained by adding any polymerization initiator commonly used, such as peroxide, persulfide, or an azo compound, in polymerization of the monomer, and performing polymerization according to a known polymerization procedure such as bulk polymerization, solution polymerization, an emulsion polymerization method, a miniemulsion method, a suspension polymerization method, or a dispersion polymerization method. A chain transfer agent commonly used, such as alkyl mercaptan or mercapto fatty acid ester, can be used for the purpose of adjustment of the molecule weight in polymerization.

The styrene acrylic modification ratio of the crystalline polyester resin is preferably 40 wt % or less, more preferably 0.1 wt % or more and 35 wt % or less, further preferably 0.2 wt % or more and 30 wt % or less based on the total amount of the crystalline polyester resin. The modification ratio is 40 wt % or less, thereby enabling a reduction in crystallinity of the crystalline polyester resin due to styrene acrylic modification to be restricted and thus enabling the crystalline polyester resin to be sufficiently crystallized, resulting in more effective suppression of leakage of the actinic radiation polymerizable compound.

The styrene acrylic modification ratio can be specifically determined from the mass ratio of an aromatic vinyl monomer and a (meth)acrylic acid ester-based monomer each serving as the styrene acrylic polymer segment, based on the total mass of a resin material for use in synthesis of the styrene acrylic-modified polyester resin, namely, the total mass of a monomer included in an unmodified polyester resin serving as the polyester segment, the aromatic vinyl monomer and the (meth)acrylic acid ester-based monomer, and the bireactive compound for binding such monomers.

The crystalline polyester resin is preferably high in affinity with the actinic radiation polymerizable compound used. In other words, the HSP distance (Ra) between the crystalline polyester resin and the actinic radiation polymerizable compound is preferably 50 or less, more preferably 5 or more and 40 or less, further preferably 10 or more and 30 or less. The HSP distance (Ra) falls within the range, thereby enabling affinity between the crystalline polyester resin and the actinic radiation polymerizable compound to be enhanced, thereby enabling an internal aggregation force of the ink to be enhanced. Thus, not only the occurrence of satellites can be more effectively suppressed, but also leakage of the actinic radiation polymerizable compound from a dot formed by landing of the ink can be more effectively suppressed.

(Polymerization Initiator)

The actinic radiation curable ink may further include, if necessary, a polymerization initiator. The polymerizable initiator may be any initiator as long as such any initiator can initiate polymerization of the actinic radiation polymerizable compound. For example, when the actinic radiation curable ink includes a radical polymerizable compound, the polymerization initiator can be a photoradical initiator, and when the actinic radiation curable ink includes a cationic polymerizable compound, the polymerization initiator can be a photocationic initiator (photo-acid generator). When the actinic radiation curable ink can be sufficiently cured even in the absence of the polymerization initiator, for example, when the actinic radiation curable ink is cured by irradiation with electron beam, no polymerization initiator is needed.

A radical polymerization initiator encompasses an intramolecular bond cleavage type radical polymerization initiator and an intramolecular hydrogen abstraction type radical polymerization initiator.

Examples of the intramolecular bond cleavage type radical polymerization initiator include acetophenone-based initiators including diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino (4-methylthiophenyl)propan-1-one and 2-benzyl-2-dimethylamino-1-(4-morpholinophenyl)-butanone, benzoins including benzoin, benzoin methyl ether and benzoin isopropyl ether, acylphosphine oxide-based initiators including 2,4,6-trimethylbenzoyldiphenylphosphine oxide, and benzyl and methylphenylglyoxy ester.

Examples of the intramolecular hydrogen abstraction type radical polymerization initiator include benzophenone-based initiators including benzophenone, methyl o-benzoyl benzoate, 4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone and 3,3'-dimethyl-4-methoxybenzophenone, thioxanthone-based initiators including 2-isopropylthioxanthone, 2,4-dimethylthioxanthone, 2,4-diethylthioxanthone and 2,4-dichlorothioxanthone, aminobenzophenone-based initiators including Michler's ketone and 4,4'-diethylaminobenzophenone, 10-butyl-2-chloroacridone, 2-ethylanthraquinone, 9,10-phenanthrenedione, and camphorquinone.

Examples of the cationic polymerization initiator include a photo-acid generator. Examples of the photo-acid generator include $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium, and phosphonium, a sulfonated product that generates sulfonic acid, halide that generates hydrogen halide, and an iron arene complex.

The content of the polymerization initiator can be arbitrarily set as long as the actinic radiation curable ink is sufficiently cured by irradiation with actinic radiation and ejecting properties of the actinic radiation curable ink are not deteriorated. For example, the content of the polymerization initiator is preferably 0.1 wt % or more and 20 wt % or less, more preferably 1 wt % or more and 12 wt % or less based on the total mass of the actinic radiation curable ink.

(Colorant)

The colorant includes a pigment and a dye. The colorant is preferably a pigment from the viewpoint that dispersion stability of the ink is more enhanced and an image high in weather resistance is formed.

Examples of the pigment include the following organic pigments and inorganic pigments described in the Color Index.

Examples of a red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50 and 88, and Pigment Orange 13, 16, 20 and 36.

Examples of a blue or cyan pigment include Pigment Blue 1, 15, 15:1, 15:2, 15:3, 15:4, 15:6, 16, 17-1, 22, 27, 28, 29, 36 and 60.

Examples of a green pigment include Pigment Green 7, 26, 36 and 50.

Examples of a yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185 and 193.

Examples of a black pigment include Pigment Black 7, 26 and 28.

Titanium oxide or a hollow particle may be used as a white pigment.

Examples of the dye include various oil-soluble dyes.

The content of the pigment or dye is preferably 0.1 wt % or more and 20 wt % or less, more preferably 0.4 wt % or more and 10 wt % or less based on the total mass of the ink. The content of the pigment or dye is 0.1 wt % or more based on the total mass of the ink, thereby allowing the resulting image to be sufficiently colored. The content of the pigment or dye is 20 wt % or less based on the total mass of the ink, thereby allowing the viscosity of the ink not to be so increased.

(Dispersant)

The pigment may be dispersed by a dispersant.

Examples of the dispersant include a surfactant and a high molecule weight dispersant, and a high molecule weight dispersant is preferable.

Examples of the high molecule weight dispersant include a (meth)acrylic resin, a styrene-(meth)acrylic resin, hydroxyl group-containing carboxylate, a salt of long-chain polyaminoamide and high molecule weight acid ester, a salt of high molecule weight polycarboxylic acid, a salt of long-chain polyaminoamide and polar acid ester, high molecule weight unsaturated acid ester, modified polyurethane, modified polyacrylate, a polyether ester-type anionic activator, a naphthalene sulfonic acid formalin condensate salt, an aromatic sulfonic acid formalin condensate salt, polyoxyethylene alkyl phosphoric acid ester, polyoxyethylene nonyl phenyl ether, stearylamine acetate, and a pigment derivative.

The pigment may be, if necessary, further enhanced in dispersibility by a dispersion aid.

The content of the dispersant is preferably 10 wt % or more and 200 wt % or less based on the total mass of the pigment. The content of the dispersant is 10 wt % or more based on the total mass of the pigment, thereby allowing dispersion stability of the pigment to be enhanced, and the content of the dispersant is 200 wt % or less based on the total mass of the pigment, thereby allowing ejecting properties of the ink through an inkjet head to be easily stabilized.

In preparation of an ink containing the pigment, it is preferable to prepare a pigment dispersion including the pigment and the actinic radiation polymerizable compound and thereafter mix the pigment dispersion with other component(s). The pigment dispersion may further include the dispersant.

The pigment dispersion can be prepared by dispersing the pigment in the actinic radiation polymerizable compound. The pigment may be dispersed by use of, for example, a ball mill, a sand mill, an attritor, a roll mill, an agitator, a Henschel mixer, a colloid mill, an ultrasound homogenizer, a pearl mill, a wet jet mill, or a paint shaker. The dispersant may be here added.

(Fixing Resin)

The actinic radiation curable ink may contain a fixing resin in order to more enhance wear resistance and blocking resistance of a coating film.

Examples of the fixing resin include a (meth)acrylic resin, an epoxy resin, a polysiloxane resin, a maleic acid resin, a vinyl resin, a polyamide resin, nitrocellulose, cellulose acetate, ethylcellulose, an ethylene-acetic acid vinyl copolymer, a urethane resin, a polyester resin, and an alkyd resin. The content of the fixing resin is preferably 1 wt % or more and 20 wt % or less, more preferably 1 wt % or more and 10 wt % or less in terms of the solid content, based on the total mass of the ink. The content of the fixing resin is 1 wt % or more based on the total mass of the ink, thereby enabling wear resistance and blocking resistance of a coating film to be more enhanced. The content of the fixing resin is 20 wt % or less based on the total mass of the ink, thereby allowing ejecting properties of the ink through an inkjet head to be easily stabilized.

(Surfactant)

The actinic radiation curable ink may contain a surfactant.

The surfactant can adjust surface tension of the ink to adjust wettability of the ink after landing to a substrate of the ink and/or inhibit neighboring droplets from being combined.

Examples of the surfactant include a silicon-based surfactant, an acetylene glycol-based surfactant, and a fluorine-based surfactant having a perfluoroalkenyl group.

The content of the surfactant is preferably 0.001 wt % or more and 10 wt % or less, more preferably 0.001 wt % or more and 1.0 wt % or less based on the total mass of the ink.

(Other Component(s))

The actinic radiation curable ink may, if necessary, further include polysaccharide, a viscosity modifier, a resistivity modifier, a film forming agent, an ultraviolet absorber, an antioxidant, a discoloration inhibitor, an anti-fungal agent, an anti-rust agent, and/or the like, in addition to the above components.

(Physical Properties of Actinic Radiation Curable Ink)

The viscosity of the actinic radiation curable ink at 80° C. is preferably 3 mPa·s or more and 20 mPa·s or less from the viewpoint of a more enhancement in injectability through an inkjet head. The viscosity of the actinic radiation curable ink at 25° C. is preferably 1000 mPa·s or more from the viewpoint of sufficient gelation of the ink landed and decreased in temperature to ordinary temperature.

The phase transition temperature in sol-gel phase transition of the actinic radiation curable ink is preferably 40° C. or more and 70° C. or less. The phase transition temperature of the actinic radiation curable ink is 40° C. or more, thereby allowing the actinic radiation curable ink to be rapidly thickened after landing onto a substrate and thus allowing the degrees of wetting and spreading to be more adjusted. The phase transition temperature of the actinic radiation curable ink is 70° C. or less, thereby allowing the actinic radiation curable ink in injection through an ejection head at which the ink temperature is usually about 80° C., to hardly undergo gelation and thus allowing the actinic radiation curable ink to be more stably injected.

The viscosity at 40° C., the viscosity at 80° C. and the phase transition temperature of the actinic radiation curable ink can be determined by measuring the change of dynamic viscoelastic modulus of the ink depending on the temperature, with a rheometer. For example, the temperature change curve of the viscosity is obtained heating the actinic radiation curable ink to 100° C. and cooling the ink to 20° C. under conditions of a shear rate of 11.7 (1/s) and a rate of temperature drop of 0.1° C./s with the viscosity being measured with a stress control-type rheometer (Physica MCR301 (diameter of cone plate: 75 mm, cone angle: 1.0°) manufactured by Anton Paar GmbH). The viscosity at 40° C. and the viscosity at 80° C. can be determined by reading the viscosities at 40° C. and 80° C., respectively, in the temperature change curve of the viscosity. The phase transition temperature can be determined as a temperature at which the viscosity is 200 mPa·s in the temperature change curve of the viscosity.

[Preparation Method of Ink]

The actinic radiation curable ink can be prepared by mixing the above actinic radiation polymerizable compound, crystalline polyester resin and wax, and any other component(s) under heating. The resulting mixed liquid is preferably here filtered by a predetermined filter. When an actinic radiation curable ink containing the pigment and the dispersant is prepared, a pigment dispersion in which the pigment and the dispersant are dispersed in the actinic radiation polymerizable compound may be prepared in advance and the remaining components may be added thereto and mixed with heating.

[Image Forming Method]

The image forming method of the present invention is an image forming method using the above actinic radiation curable inkjet ink. Specifically, the image forming method of the present invention is an image forming method including ejecting the actinic radiation curable inkjet ink heated to 40 to 120° C. through an inkjet head to land the actinic radiation curable inkjet ink ejected, onto a surface of a recording medium or an intermediate transfer member whose surface temperature is 60° C. or less, and irradiating the actinic radiation curable inkjet ink landed with actinic radiation.

The above actinic radiation curable ink is ejected through an inkjet head in ejecting of the actinic radiation curable ink to land the ink onto the surface of the recording medium or the intermediate transfer member.

When a multi-color image is formed by ejecting and landing droplets of a plurality of the actinic radiation curable inks different in constitution (for example, the type or amount of the colorant) from each other, at least one of the plurality of the actinic radiation curable inks corresponds to the above actinic radiation curable ink. Herein, two or more of the actinic radiation curable inks ejected are preferably the above actinic radiation curable inks (the droplets of the plurality of the actinic radiation curable inks different in constitution from each other are ejected and landed on the recording medium). All the actinic radiation curable ink ejected are more preferably the above actinic radiation curable inks from the above viewpoints.

The inkjet head may be any of on-demand and continuous inkjet heads. Examples of the on-demand inkjet head include electric-mechanical conversion systems including a single cavity type, a double cavity type, a bender type, a piston type, a shear mode type, and a shared wall type, and electric-thermal conversion systems including a thermal inkjet type and a Bubble Jet (Bubble Jet is a registered trademark of Canon Inc.) type.

The inkjet head may be any of scanning and line inkjet heads.

The actinic radiation curable ink in the inkjet head is heated to 40 to 120° C. and the actinic radiation curable ink heated is ejected in order to enhance ejecting properties of an ink droplet. The viscosity of the actinic radiation curable ink at the temperature in the inkjet head is preferably 3 mPa·s or more and less than 20 mPa·s from the viewpoint of ejection stability.

The temperature of the actinic radiation curable ink in the inkjet head is preferably set to a temperature higher than the gelation temperature of the actinic radiation curable ink by 10° C. or more and less than 40° C. The temperature of the actinic radiation curable ink in the inkjet head is set to a temperature higher than the gelation temperature by 10° C. or more, thereby enabling the actinic radiation curable ink to be favorably injected without any gelation of the actinic radiation curable ink in the inkjet head or on the nozzle surface. The temperature of the actinic radiation curable ink in the inkjet head is set to a temperature higher than the gelation temperature of the actinic radiation curable ink by less than 40° C., thereby enabling a thermal load to the inkjet head to be decreased. In particular, an inkjet head using a piezo element is easily deteriorated in performance due to such a thermal load, and thus the temperature of the actinic radiation curable ink particularly preferably falls within the range.

The actinic radiation curable ink is here increased in internal aggregation force due to high affinity between the actinic radiation polymerizable compound and the crystalline polyester. Thus, satellites are hardly caused in ejection.

The actinic radiation curable ink ejected is landed on the surface of the recording medium or the intermediate transfer member.

The recording medium may be any medium on which an image can be formed by an inkjet method, and can be any of absorbable medium, for example, coated paper encompassing art paper, coated paper, light-weight coated paper, finely coated paper and cast paper, and uncoated paper, non-absorbable recording medium and intermediate transfer member including plastic encompassing polyester, polyvinyl chloride, polyethylene, polyurethane, polypropylene, acrylic resin, poly carbonate, polystyrene, acrylonitrile-butadiene-styrene copolymer, polyethylene terephthalate and polybutadiene terephthalate, and a non-absorbable inorganic recording medium such as a metal and glass. Examples of various plastic films which can be used include a PP film, a PET film, an OPS film, an OPP film, an ONy film, a PVC film, a PE film, and a TAC film. Examples of other plastics which can be used include poly carbonate, an acrylic resin, ABS, polyacetal, PVA, and rubber. Such plastics can also be applied to a metal and glass. The ink of the present invention can form an image high in glossiness as compared with a conventional ink, and is suitably applied to, for example, coated paper relatively high in glossiness.

The intermediate transfer member may be a known intermediate transfer member for use in formation of an image by an inkjet method.

The actinic radiation curable ink landed on the surface of the recording medium or the intermediate transfer member undergoes pinning with crystallization of the wax. The crystalline polyester resin is here crystallized, resulting in suppression of leakage of the actinic radiation polymerizable compound from a dot formed by the actinic radiation curable ink landed.

The surface temperature of the recording medium or the intermediate transfer member is here 60° C. or less in order to enhance pinning properties of the ink.

In landing of the actinic radiation curable ink ejected, onto the surface of the recording medium or the intermediate transfer member, the image forming method of the present embodiment includes transferring the actinic radiation curable ink landed, to another recording medium, before the irradiation with actinic radiation Such transferring may be conducted by, for example, contacting a surface of the intermediate transfer member, onto which the actinic radiation curable ink is landed, with a surface of the recording medium, on which an image is to be formed, and performing pushing from the intermediate transfer member toward the recording medium.

The irradiation with actinic radiation includes irradiating the surface of the recording medium or the intermediate transfer member, onto which the actinic radiation curable ink is landed, with actinic radiation.

Examples of the actinic radiation include electron beam, ultraviolet light, $\alpha$-ray, $\gamma$-ray, and X-ray. In particular, irradiation with ultraviolet light is preferable from the viewpoint of easiness of handling and less effect on human bodies, and irradiation with electron beam is preferable from the viewpoint of facilitating curing of the actinic radiation curable ink. The light source of ultraviolet light is preferably a light-emitting diode (LED) from the viewpoint that the occurrence of curing failure of the actinic radiation curable ink due to melting of the actinic radiation curable ink by heat of radiation of the light source is suppressed. Examples of a LED light source that can radiate actinic radiation for curing of the ink include 395-nm water cooled LEDs, manufactured by Phoseon Technology, manufactured by Heraeus, manufactured by Kyocera Corporation, manufactured by HOYA Corporation, and manufactured by Integration Technology Co., Ltd.

The energy of actinic radiation for irradiation is preferably 200 mJ/cm$^2$ or more and 1000 mJ/cm$^2$. The energy is 200 mJ/cm$^2$ or more, thereby enabling the actinic radiation polymerizable compound to be sufficiently polymerized and crosslinked. The energy is 1000 mJ/cm$^2$ or less, thereby hardly causing deterioration in pinning properties due to re-melting of the wax by heat of actinic radiation for irradiation. The energy of actinic radiation for irradiation is more preferably 300 mJ/cm$^2$ or more and 800 mJ/cm$^2$ or less, further preferably 350 mJ/cm$^2$ or more and 500 mJ/cm$^2$ or less from the above viewpoints.

[Image Forming Apparatus]

The image forming apparatus of the present invention is an image forming apparatus that forms an image by use of the above actinic radiation curable inkjet ink. Specifically, the image forming apparatus of the present invention is an image forming apparatus including an ink ejection section that ejects an actinic radiation curable inkjet ink heated to 40 to 120° C. through an inkjet head, a conveyance path that conveys a recording medium onto which the actinic radiation curable inkjet ink ejected, is to be landed, to land the ink onto a surface of the recording medium or the intermediate transfer member, on which the surface temperature is 60° C.

or less, and an irradiation section that irradiates the actinic radiation curable inkjet ink landed with actinic radiation.

FIG. 1 illustrates a schematic view illustrating an exemplary configuration of an inkjet image forming apparatus according to an embodiment of the present invention.

Image forming apparatus 100 includes conveyance path 120 that conveys recording medium 110, intermediate image forming section 140 that is disposed opposite to a surface of conveyance path 120, on which recording medium 110 is to be conveyed, and that forms an intermediate image by application of an actinic radiation curable ink to a surface of intermediate transfer member 130, and transfer section 150 that transfers an intermediate image including the actinic radiation curable ink to the recording medium Image forming apparatus 100 further includes three supporting rollers 160, 161 and 162 on which intermediate transfer member 130 having an endless belt shape extends, irradiation section 170 that irradiates a surface of conveyance path 120 with actinic radiation for curing (mainly curing) of the actinic radiation curable ink included in the intermediate image, and cleaning section 180 that removes the actinic radiation curable ink remaining on the surface of intermediate transfer member 130, not transferred to recording medium 110, from the surface of intermediate transfer member 130.

Conveyance path 120, for example, includes a metallic drum, and conveys the intermediate image to recording medium 110 on which such an image is to be transferred. Conveyance path 120 is disposed with being in contact with a surface of a portion of intermediate transfer member 130, and a transfer nip is formed by pressurizing such a contact surface of intermediate transfer member 130 by supporting roller 161. Conveyance path 120 may include a claw (not illustrated) that secures a tip of recording medium 110. Conveyance path 120 conveys recording medium 110 to the transfer nip by securing the tip of recording medium 110 to the claw and conducting anticlockwise rotation in FIG. 1.

Intermediate transfer member 130 includes three supporting rollers 160, 161 and 162. Intermediate transfer member 130 includes an endless belt, extends on three supporting rollers 160, 161 and 162 in an inverted triangle manner, and conveys the intermediate image formed on the surface of intermediate transfer member 130 by intermediate image forming section 140, toward transfer section 150.

At least one roller of three supporting rollers 160, 161 and 162 is a driving roller, and rotates intermediate transfer member 130 in A-direction.

Intermediate transfer member 130 includes a substrate layer including a resin having a structural unit including a benzene ring, such as aromatic polyimide (PI), aromatic polyamideimide (PAI), polyphenylene sulfide (PPS), aromatic polyether ether ketone (PEEK), aromatic poly carbonate and aromatic polyether ketone, polyvinylidene fluoride, and a mixture or a copolymerized product thereof. Intermediate transfer member 130 may include, in addition to the substrate layer, both or any one of an elastic layer including rubber such as silicone rubber (SR), chloroprene rubber (CR), nitrile rubber (NBR) and epichlorohydrin rubber (ECO), an elastomer, and an elastic resin, and a surface layer including a fluororesin and an acrylic resin, such as polytetrafluoroethylene (PTFE), perfluoroalkoxyalkane (PFA) and polyvinylidene fluoride (PVDF), on a surface of the member, onto which the ink is to be landed.

Alternatively, intermediate transfer member 130 may be formed from, for example, a resin film such as a polyethylene terephthalate (PET) film, a 1,4-polycyclohexylene dimethylene terephthalate film, a polyethylene naphthalate (PEN) film, a polyphenylene sulfide film, a polystyrene (PS) film, a polypropylene (PP) film, a polysulfone film, an aramid film, a poly carbonate film, a polyvinyl alcohol film, a polyethylene (PE) film, a polyvinyl chloride film, a nylon film, a polyimide film and an ionomer film, and/or a cellulose derivative such as cellophane and cellulose acetate.

Portions of intermediate transfer member 130, located at right and left vertex portions of an inverted triangle and extending on supporting rollers 160 and 162, each serve as a surface onto which the ink ejected through an inkjet head is to be landed. Supporting roller 161 located at a lower vertex portion of an inverted triangle of intermediate transfer member 130 is a pressurizing roller that pressurizes intermediate transfer member 130 toward conveyance path 120 at a predetermined nip pressure, and serves as a transfer section that transfers the intermediate image formed by landing of the ink ejected through each inkjet head, toward recording medium 110.

Intermediate image forming section 140 also serving as an ink ejection section is an ink application section that forms such an intermediate image by an inkjet method, and includes inkjet heads 140Y, 140M, 140C and 140K that eject actinic radiation curable inks of the colors of Y (yellow), M (magenta), C (cyan), and K (black), respectively, through nozzles, to land the inks onto a surface of intermediate transfer member 130. Inkjet heads 140Y, 140M, 140C and 140K allow the actinic radiation curable inks of the respective colors, heated to 40 to 120° C., to be landed on the surface of intermediate transfer member 130, depending on an image to be formed, resulting in formation of such an intermediate image.

Transfer section 150 corresponds to a section including a transfer nip where intermediate transfer member 130 and conveyance path 120 closest approach to each other, and pressurizes a surface of conveyance path 120, with which intermediate transfer member 130 is contacted, by biasing intermediate transfer member 130 by supporting roller 161 in a direction of conveyance path 120. The intermediate image formed on the surface of intermediate transfer member 130 and conveyed, and recording medium 110 disposed on the surface of conveyance path 120 and conveyed are contacted with each other at a transfer nip, pressurized from intermediate transfer member 130 to conveyance path 120 with supporting roller 161 being interposed, and thus transferred to the recording medium.

Irradiation section 170 is disposed downstream of transfer section 150 in a conveyance direction of recording medium 110 by conveyance path 120, and irradiates the surface of conveyance path 120 with actinic radiation. Thus, irradiation section 170 irradiates the actinic radiation curable ink included in the intermediate image transferred to recording medium 110, with actinic energy radiation, thereby curing (mainly curing) the actinic radiation curable ink included in the intermediate image. Thus, an objective image is formed on a surface of recording medium 110.

Cleaning section 180 is a cleaning roller such as a web roller or a sponge roller, and is contacted with the surface of intermediate transfer member 130 in the downstream of transfer section 150. Cleaning section 180 removes any ink that remains on the surface of intermediate transfer member 130 (remaining coating product) without the ink being transferred to recording medium 110 in transfer section 150, by driving rotation of the cleaning roller.

Image forming apparatus 100 may include a temperature regulator not illustrated, which regulates the surface temperature on a surface of intermediate transfer member 130, onto which the ink is to be landed, to 60° C. or less.

While the image forming apparatus including the intermediate transfer member is described above, the image forming apparatus of the present invention may have a configuration where no intermediate transfer member is included and the actinic radiation curable ink ejected from the ink ejection section is directly landed onto the recording medium being conveyed on the conveyance path.

EXAMPLES

Hereinafter, the present invention will be more specifically described with reference to the following examinations, but the present invention is not limited to the following examinations.

[Synthesis of Crystalline Polyester Resin (CPEs)]
(Synthesis of Crystalline Polyester Resin (C1))

The following raw material compounds of a crystalline polyester segment were placed in a four-necked flask equipped with a nitrogen introduction tube, a dewatering conduit, a stirrer and a thermocouple, and heated to 170° C. and molten, thereby providing crystalline polyester resin (C1).

| Dodecanedicarboxylic acid | 103.0 parts by mass |
| Ethylene glycol | 24.7 parts by mass |

Crystalline polyester resin (C1) obtained had a weight average molecular weight (Mw) of 22000, a melting point (mp) of 76.8° C., and a recrystallization temperature (Rc) of 70.0° C.

(Synthesis of Crystalline Polyester Resin (C2))

The following raw material compounds and radical polymerization initiator of a styrene acrylic segment, including a bireactive compound, were placed in a dropping funnel.

| Styrene (St) | 1.7 parts by mass |
| 2-Ethylhexylacrylate (2-EHA) | 0.5 parts by mass |
| Acrylic acid (AA) | 6.3 parts by mass |
| Polymerization initiator (di-t-butyl peroxide) | 7.0 parts by mass |

The following raw material monomer of a crystalline polyester segment was placed in a four-necked flask equipped with a nitrogen introduction tube, a dewatering conduit, a stirrer and a thermocouple, and heated to 170° C. and molten.

| Succinic acid | 50.0 parts by mass |
| 1,12-Dodecanediol | 112.0 parts by mass |

Next, the raw material compounds of a styrene acrylic segment were dropped into the resulting solution described above with stirring over 90 minutes, and stirred for 60 minutes, and thereafter an unreacted compound for addition polymerization was removed at a reduced pressure (8 kPa). The amount of the compound here removed was a trace amount as compared with the amounts of the raw material compounds of the resin. Thereafter, 0.8 parts by mass of Ti $(OBu)_4$ as an esterification catalyst was loaded, and a reaction was performed with a temperature rise to 235° C. at ordinary pressure (101.3 kPa) for 5 hours and furthermore at a reduced pressure (8 kPa) for 1 hour. Next, the resultant was cooled to 200° C., and thereafter was reacted at a reduced pressure (20 kPa) for 1 hour, thereby providing crystalline polyester resin C2. Crystalline polyester resin (C2) obtained had a weight average molecular weight (Mw) of 18000, a melting point (mp) of 74.6° C., a recrystallization temperature (Rc) of 68.1° C., and a styrene acrylic modification ratio of 5.0%.

(Synthesis of Crystalline Polyester Resin (C3))

Crystalline polyester resin (C3) was synthesized with amounts compounded, shown in Table 1, in the same manner as in crystalline polyester resin (C2). Crystalline polyester resin (C3) obtained had a weight average molecular weight (Mw) of 15000, a melting point (mp) of 71.0° C., a recrystallization temperature (Rc) of 65.8° C., and a styrene acrylic modification ratio of 38.0%.

(Synthesis of Crystalline Polyester Resin (C4))

Crystalline polyester resin (C4) was synthesized with amounts compounded, shown in Table 1, in the same manner as in crystalline polyester resin (C2). Crystalline polyester resin (C4) obtained had a weight average molecular weight (Mw) of 13000, a melting point (mp) of 68.5° C., a recrystallization temperature (Rc) of 63.3° C., and a styrene acrylic modification ratio of 42.0%.

Respective physical properties (weight average molecular weight, melting point and recrystallization temperature) of the crystalline polyester resins (C1) to (C4) were measured by the following methods.

(Weight Average Molecular Weight)

A GPC apparatus HLC-8120GPC (manufactured by Tosoh Corporation), and a column TSK guard column+ TSKgel SuperHZ-m triple (manufactured by Tosoh Corporation) were used, and tetrahydrofuran as a carrier solvent was allowed to flow at a flow rate of 0.2 mL/min with the column temperature being kept at 40° C. Not only the carrier solvent, but also 10 μL of a sample liquid prepared was poured into a GPC apparatus, the sample was detected by use of a refractive index detector (RI detector), and the molecule weight distribution of the sample was calculated by use of a calibration curve obtained by measurement with a monodispersion polystyrene standard particle.

(Melting Point)

The melting point (Tm) was obtained by encapsulating 3.0 mg of a crystalline resin sample into an aluminum pan KITNO.B0143013, mounting the resultant to a sample holder of Diamond DSC, varying the temperature in the order of heating, cooling, and heating, in which the temperature was raised from room temperature (25° C.) to 150° C. at a rate of temperature rise of 10° C./min and kept at 150° C. for 5 minutes at the first and second heatings, and the temperature was dropped from 150° C. to 0° C. at a rate of temperature drop of 10° C./min and kept at 0° C. for 5 minutes in the cooling, and determining the temperature at a peak top of an endothermic peak in an endothermic curve obtained at the second heating, as the melting point (Tm).

(Recrystallization Temperature)

The recrystallization temperature (Rc) was obtained by performing sample-setting in the same apparatus by the same sample encapsulation method as in measurement of the melting point of the crystalline resin, according to differential scanning calorimetry (DSC), thereafter heating the crystalline resin from room temperature to 100° C. at a rate of temperature rise of 10° C./min, holding the temperature for 1 minute, cooling the crystalline resin to 0° C. at a rate of temperature drop of 0.1° C./min, and determining the temperature at a peak top of an exothermic peak in a measurement curve obtained at such temperature drop.

Table 1 shows the amount (unit: parts by mass) of each component compounded, of crystalline polyester resins (C1) to (C4).

TABLE 1

|  | | C1 | C2 | C3 | C4 |
|---|---|---|---|---|---|
| Polyvalent carboxylic acid compound | Succinic acid | — | 50.0 | 50.0 | 50.0 |
|  | Dodecanedi-carboxylic acid | 103.0 | — | — | — |
| Polyhydric alcohol compound | Ethylene glycol | 24.7 | — | — | — |
|  | 1,12-Dodecanediol | — | 112.0 | 112.0 | 112.0 |
| Vinyl monomer | St | 0.0 | 1.7 | 22.5 | 23.0 |
| (Meth)acrylic acid-based monomer | 2-EHA | 0.0 | 0.5 | 7.0 | 10.5 |
| Bireactive compound | AA | 0.0 | 6.3 | 70.0 | 84.0 |
|  | Styrene acrylic modification ratio (wt %) | 0.0 | 5.0 | 38.0 | 42.0 |

Unit of each component (parts by mass)

(Preparation of Pigment Dispersion)

A pigment dispersion was prepared according to the following procedure.

A stainless beaker was charged with 9.0 parts by mass of a pigment dispersant (Ajisper PB824 manufactured by Ajinomoto Fine-Techno Co., Ltd., "Ajisper" being a registered trademark of Ajinomoto Co., Inc.), 70 parts by mass of an actinic radiation polymerizable compound (tripropylene glycol diacrylate (APG-200, manufactured by Shin-Nakamura Chemical Co., Ltd.)), and 0.02 parts by mass of a polymerization inhibitor (Irgastab UV10, manufactured by BASF SE), and the content was heated and stirred for 1 hour with being heated on a hot plate at 65° C.

The mixed liquid was cooled to room temperature, and thereafter 21 parts by mass of Pigment Red 122 (Chromofine Red 6112JC manufactured by Dainichiseika Color & Chemicals Mfg. Co., Ltd.) was added thereto. The mixed liquid, together with 200 g of zirconia beads each having a diameter of 0.5 mm, was placed in a glass bottle, the glass bottle was tightly plugged, and the resultant was subjected to a dispersion treatment in a paint shaker for 8 hours. Thereafter, the zirconia beads were removed, thereby preparing pigment dispersion 1.

(Preparation of Ink)

An ink including crystalline polyester resin (C1) was prepared according to the following procedure.

A stainless beaker was charged with 5.00 wt % of crystalline polyester resin (C1), 3.00 wt % of wax (W1) (distearyl ketone: product name Kao Wax T1, manufactured by Kao Corporation), actinic radiation polymerizable compound (M1) (polyethylene glycol #400 diacrylate, A-400: manufactured by Shin-Nakamura Chemical Co., Ltd., 46.0 wt %), 18.4 wt % of 6EO-modified trimethylolpropane triacrylate (SR499: manufactured by Sartomer), 4EO-modified pentaerythritol tetraacrylate (SR494: manufactured by Sartomer, 27.6 wt %), 6.0 wt % of a polymerization initiator (DAROCUR TPO, manufactured by BASF SE, "DAROCUR" being a registered trademark of the Company), 0.1 wt % of a polymerization initiator (ITX, manufactured by DKSH Management Ltd.), 0.1 wt % of a polymerization inhibitor (Irgastab UV-10, manufactured by BASF SE), 0.1 wt % of a surfactant (KF-352, manufactured by Shin-Etsu Chemical Co., Ltd.), and pigment dispersion (19.0 wt %), and the mixture was stirred with heating on a hot plate at 80° C. for 1 hour. The resulting solution was filtered by a Teflon (registered trademark) 3-μm membrane filter manufactured by ADVANTEC, with heating, thereby providing ink 1 including crystalline polyester resin (C1).

Inks 2 to 23 were obtained by compounding their respective components at respective proportions shown in Table 2 in the same manner as in ink 1.

The content of each component of inks 1 to 23 prepared is shown in Table 2. Each symbol shown in Table 2 is as follows.

M1: actinic radiation polymerizable compound obtained by compounding polyethylene glycol #400 diacrylate, 6EO-modified trimethylolpropane triacrylate, and 4EO-modified pentaerythritol tetraacrylate, at a mass ratio of 50:30:20 based on the total mass of the ink M2: actinic radiation polymerizable compound obtained by compounding polyethylene glycol #400 diacrylate, 6EO-modified trimethylolpropane triacrylate, and 4EO-modified pentaerythritol tetraacrylate, at a mass ratio of 70:20:10 based on the total mass of the ink C1 to C4: each crystalline polyester resin shown in Table 1 above W1: distearyl ketone (Kao Wax T1, manufactured by Kao Corporation)

W2: stearyl stearate (Exceparl SS, manufactured by Kao Corporation, "Exceparl" being a registered trademark of the Company)

W3: cetyl myristate

W4: dibehenyl ketone

W5: distearyl ketone

W6: dilauryl ketone

W7: paraffin (Paraffin-wax-155, manufactured by Nippon Seiro Co., Ltd.)

W8: paraffin (Paraffin-wax-135, manufactured by Nippon Seiro Co., Ltd.)

W9: microcrystalline wax (Hi-MIC-1045, manufactured by Yamakei)

W10: microcrystalline wax (Hi-MIC-2045, manufactured by Yamakei)

W11: aliphatic amide (stearic acid amide)

TABLE 2

| | Crystalline polyester resin (CPEs) (wt %) | | | | Wax (wt %) | | | | | | | | | | | | Actinic radiation polymerizable compound | |
|---|---|---|---|---|---|---|---|---|---|---|---|---|---|---|---|---|---|---|
| Ink | C1 | C2 | C3 | C4 | W1 | W2 | W3 | W4 | W5 | W6 | W7 | W8 | W9 | W10 | W11 | Total | M1 | M2 |
| 1 | 5.00 | — | — | — | 3.00 | — | — | — | — | — | — | — | — | — | — | 3.00 | Balance | — |
| 2 | 5.00 | — | — | — | — | 3.00 | — | — | — | — | — | — | — | — | — | 3.00 | Balance | — |
| 3 | 5.00 | — | — | — | — | — | 3.00 | — | — | — | — | — | — | — | — | 3.00 | Balance | — |
| 4 | 5.00 | — | — | — | — | — | — | 3.00 | — | — | — | — | — | — | — | 3.00 | Balance | — |
| 5 | 5.00 | — | — | — | — | — | — | — | 3.00 | — | — | — | — | — | — | 3.00 | Balance | — |
| 6 | 5.00 | — | — | — | — | — | — | — | — | 3.00 | — | — | — | — | — | 3.00 | Balance | — |
| 7 | 5.00 | — | — | — | — | — | — | — | — | — | 3.00 | — | — | — | — | 3.00 | Balance | — |
| 8 | 5.00 | — | — | — | — | — | — | — | — | — | — | 3.00 | — | — | — | 3.00 | Balance | — |
| 9 | 5.00 | — | — | — | — | — | — | — | — | — | — | — | 3.00 | — | — | 3.00 | Balance | — |

TABLE 2-continued

| | Crystalline polyester resin (CPEs) (wt %) | | | | Wax (wt %) | | | | | | | | | | | | Actinic radiation polymerizable compound | |
|---|---|---|---|---|---|---|---|---|---|---|---|---|---|---|---|---|---|---|
| Ink | C1 | C2 | C3 | C4 | W1 | W2 | W3 | W4 | W5 | W6 | W7 | W8 | W9 | W10 | W11 | Total | M1 | M2 |
| 10 | 5.00 | — | — | — | — | — | — | — | — | — | — | — | — | 3.00 | — | 3.00 | Balance | — |
| 11 | 5.00 | — | — | — | — | 2.00 | — | — | 1.00 | — | — | — | — | — | — | 3.00 | Balance | — |
| 12 | 1.00 | — | — | — | — | 2.00 | — | — | 1.00 | — | — | — | — | — | — | 3.00 | Balance | — |
| 13 | — | 2.00 | — | — | — | 0.02 | — | — | 0.02 | — | — | — | — | — | — | 0.04 | — | Balance |
| 14 | — | 3.00 | — | — | — | 1.00 | — | — | 1.00 | — | — | — | — | — | — | 2.00 | — | Balance |
| 15 | — | 7.00 | — | — | — | 3.40 | — | — | 3.40 | — | — | — | — | — | — | 6.80 | — | Balance |
| 16 | — | 0.20 | — | — | — | 2.00 | — | — | 1.00 | — | — | — | — | — | — | 3.00 | — | Balance |
| 17 | — | 2.00 | — | — | — | 2.00 | — | — | 1.00 | — | — | — | — | — | — | 3.00 | — | Balance |
| 18 | — | 9.60 | — | — | — | 2.00 | — | — | 1.00 | — | — | — | — | — | — | 3.00 | — | Balance |
| 19 | — | — | 5.00 | — | — | 1.50 | — | — | 1.50 | — | — | — | — | — | — | 3.00 | — | Balance |
| 20 | — | — | — | 5.00 | — | 1.50 | — | — | 1.50 | — | — | — | — | — | — | 3.00 | — | Balance |
| 21 | — | — | — | — | — | 3.00 | — | — | — | — | — | — | — | — | — | 3.00 | Balance | — |
| 22 | — | — | — | — | — | 2.00 | — | — | 1.00 | — | — | — | — | — | — | 3.00 | Balance | — |
| 23 | 5.00 | — | — | — | — | — | — | — | — | — | — | — | — | — | 3.00 | 3.00 | Balance | — |

The HSP distance (Ra) between the crystalline polyester resin (CPE) and wax, and the actinic radiation polymerizable compound, included in each of inks 1 to 23 is shown in Table 3.

TABLE 3

| | HSP distance from actinic radiation polymerizable compound (Ra) | | | | | | | | | | | |
|---|---|---|---|---|---|---|---|---|---|---|---|---|
| Ink | CPEs | W1 | W2 | W3 | W4 | W5 | W6 | W7 | W8 | W9 | W10 | W11 |
| 1 | 21.8 | 14.8 | — | — | — | — | — | — | — | — | — | — |
| 2 | 21.8 | — | 14.1 | — | — | — | — | — | — | — | — | — |
| 3 | 21.8 | — | — | 13.6 | — | — | — | — | — | — | — | — |
| 4 | 21.8 | — | — | — | 15.1 | — | — | — | — | — | — | — |
| 5 | 21.8 | — | — | — | — | 14.5 | — | — | — | — | — | — |
| 6 | 21.8 | — | — | — | — | — | 14.0 | — | — | — | — | — |
| 7 | 21.8 | — | — | — | — | — | — | 17.8 | — | — | — | — |
| 8 | 21.8 | — | — | — | — | — | — | — | 17.8 | — | — | — |
| 9 | 21.8 | — | — | — | — | — | — | — | — | 17.8 | — | — |
| 10 | 21.8 | — | — | — | — | — | — | — | — | — | 17.8 | — |
| 11 | 21.8 | — | 14.1 | — | — | 14.5 | — | — | — | — | — | — |
| 12 | 21.8 | — | 14.1 | — | — | 14.5 | — | — | — | — | — | — |
| 13 | 18.5 | — | 14.3 | — | — | 14.7 | — | — | — | — | — | — |
| 14 | 18.5 | — | 14.3 | — | — | 14.7 | — | — | — | — | — | — |
| 15 | 18.5 | — | 14.3 | — | — | 14.7 | — | — | — | — | — | — |
| 16 | 18.5 | — | 14.3 | — | — | 14.7 | — | — | — | — | — | — |
| 17 | 18.5 | — | 14.3 | — | — | 14.7 | — | — | — | — | — | — |
| 18 | 18.5 | — | 14.3 | — | — | 14.7 | — | — | — | — | — | — |
| 19 | 11.3 | — | 14.3 | — | — | 14.7 | — | — | — | — | — | — |
| 20 | 10.9 | — | 14.3 | — | — | 14.7 | — | — | — | — | — | — |
| 21 | — | — | 14.1 | — | — | — | — | — | — | — | — | — |
| 22 | — | — | 14.1 | — | — | 14.5 | — | — | — | — | — | — |
| 23 | 21.8 | — | — | — | — | — | — | — | — | — | — | 8.2 |

Inks 1 to 23 were subjected to evaluation of leakage, evaluation of satellite properties, and evaluation of pinning properties under the following conditions.

[Evaluation of Leakage]
(Evaluation Method)

Each ink was injected to a resin film at 30° C. (temperature in ejection: 80° C.), and 400 of dots formed as above were observed with an optical microscope. When the actinic radiation polymerizable compound was leaked from such a dot, a state was observed where the actinic radiation polymerizable compound was spread outward such a dot including the pigment. Evaluation of pinning properties was performed to determine the percentage of dot(s) where the ratio of the difference between the outer size and the inner size to the inner size, in the above dots, was 10% or more. The resin film used in the present evaluation was made of polyethylene terephthalate (PET), polypropylene (PP), or a tetrafluoroethylene perfluoroalkyl vinyl ether copolymer (PFA).

The "outer size" of such each dot corresponded to the longest diameter among diameters of such each dot including a portion spread of the actinic radiation polymerizable compound. The "inner size" corresponded to a diameter of each dot including the pigment, and was measured in a straight line for metering the outer size.

(Evaluation Criteria)
The evaluation criteria of leakage are as follows.
A: the percentage was 0 to 10
B: the percentage was 11 to 20
C: the percentage was 21 to 30
D: the percentage was 31

[Evaluation of Satellite Properties]
The image variation was more suppressed as satellites and mist were less generated, and thus satellite properties were evaluated with respect to the image variation. Evaluation of satellites was made according to the following criteria by visually confirming the presence of the image variation with respect to each image formed. Rating C and ratings more favorable than rating C in the evaluation criteria are assumed to pass.

(Evaluation Method)

Each ink composition was introduced into an inkjet head (HA1024 Model, manufactured by Konica Minolta, Inc.). Each patch in a 10-point scale gradation pattern with a dot area ratio of 10 to 100% was input as data, each ink composition was ejected and landed onto a recording medium under conditions of a resolution of 720×720 dpi and a voltage of 16 V and under conditions of an ambient temperature of 25° C. and an ambient humidity of 55%, and thereafter a droplet of the ink composition, landed, was irradiated with ultraviolet light at an energy of 250 mJ/cm$^2$ by a LED lamp to cure the droplet of the ink composition, thereby forming such a 10-point scale gradation pattern with a dot area ratio of 10 to 100%. The recording medium here used was a printing sheet (OK Top Coat, manufactured by Oji Paper Co., Ltd., "Top Coat" being a registered trademark of the Company).

(Evaluation Criteria)
- A: No image variation occurred in all the gradation patches of 10-point scale
- B: Image variation was observed in one patch among all the gradation patches of 10-point scale
- C: Image variation was observed in two or three patches among all the gradation patches of 10-point scale
- D: Image variation was observed in four or more patches among all the gradation patches of 10-point scale

[Evaluation of Pinning Properties]

(Evaluation Method)

Each ink was introduced into an inkjet head HA512 Model, manufactured by Konica Minolta, Inc., each color ink was landed onto a printing substrate at 50° C. with the amount of each color droplet being adjusted so that a color to be formed was close to pantone Red 032 under conditions of a printing width of 100 mm×100 mm and a resolution of 720×720 dpi, thereby printing a solid image having a coverage rate of 100%. The printing substrate here used was OK Top Coat (printing sheet). The light source for irradiation with ultraviolet light, here used, was a LED lamp, and the ink used for printing was irradiated with ultraviolet light at an energy of 250 mJ and thus cured.

The image with each actinic radiation curable ink was observed with a microscope (×200), the average value of droplet sizes at 10 positions randomly selected was determined, and the absolute value of the difference from a suitable droplet size (60 μm) was determined.

(Evaluation Criteria)
- A: The absolute value of the difference from such a suitable droplet size was less than 3 μm
- B: The absolute value of the difference from such a suitable droplet size was 3 μm or more and 5 μm or less
- C: The absolute value of the difference from such a suitable droplet size was more than 5 μm The results of various evaluations of inks 1 to 23 are shown in Table 4.

TABLE 4

| Ink | Leakage | | | Satellite | Pinning properties |
|---|---|---|---|---|---|
|  | PET | PP | PFA | | |
| 1 | B | B | B | B | B |
| 2 | B | B | B | B | B |
| 3 | B | B | B | B | C |
| 4 | B | B | B | B | B |
| 5 | B | B | B | B | B |
| 6 | B | B | B | B | C |
| 7 | B | B | B | B | C |
| 8 | B | B | B | B | C |
| 9 | B | B | B | B | C |
| 10 | B | B | B | B | C |
| 11 | B | B | B | B | A |
| 12 | C | B | B | C | A |
| 13 | A | A | A | A | A |
| 14 | A | A | A | A | A |
| 15 | A | A | A | A | A |
| 16 | C | B | B | C | A |
| 17 | C | B | B | A | A |
| 18 | A | A | A | A | A |
| 19 | A | A | A | A | A |
| 20 | B | B | B | B | A |
| 21 | D | D | D | D | A |
| 22 | D | D | D | D | A |
| 23 | D | D | D | A | C |

Each HSP distance (Ra) between C1 to C4 and W1 to W11, and actinic radiation polymerizable compounds M1 and M2 is shown in Table 5. Such each HSP distance is a value determined according to the following expression by obtaining the respective weighted averages of the values of the dispersion term (dD), the polarity term (dP), and the hydrogen bond term (dH) with respect to each compound included in each component, determined by Hansen solubility parameter software "HSPiP vers", at the molar ratio of such compounds included in such components, to provide the values of the dispersion term (dD), the polarity term (dP), and the hydrogen bond term (dH) of such each component, and defining the dispersion term, the polarity term, and the hydrogen bond term of one component of such components as dD, dP, and dH, and the dispersion term, the polarity term, and the hydrogen bond term of other component of such components as dD', dP', and dH', respectively.

$$\text{HSP distance} = (4\times(dD-dD')^2+(dP-dP')^2+(dH-dH')^2)^{1/2}$$

TABLE 5

|  |  | Actinic radiation polymerizable compound | |
|---|---|---|---|
|  |  | M1 | M2 |
| Crystalline polyester resin | C1 | 21.8 | 21.6 |
|  | C2 | 18.6 | 18.5 |
|  | C3 | 11.4 | 11.3 |
|  | C4 | 11.0 | 10.9 |
| Wax | W1 | 14.8 | 15.1 |
|  | W2 | 14.1 | 14.3 |
|  | W3 | 13.6 | 13.9 |
|  | W4 | 15.1 | 15.3 |
|  | W5 | 14.5 | 14.7 |
|  | W6 | 14.0 | 14.2 |
|  | W7 | 17.8 | 18.0 |
|  | W8 | 17.8 | 18.0 |
|  | W9 | 17.8 | 18.0 |
|  | W10 | 17.8 | 18.0 |
|  | W11 | 8.2 | 7.9 |

It has been found from the results with respect to inks 1 to 23 that the crystalline polyester resin and the wax low in polarity are included in the ink to thereby not only enable the occurrence of satellites in injection of the ink and leakage of the actinic radiation polymerizable compound from a dot formed to be suppressed, but also allow pinning properties of the ink after landing to be enhanced. The reason is considered because not only high affinity between the crystalline polyester resin and the actinic radiation polymerizable compound generates an internal aggregation force of the ink, but also the wax is hardly compatible with the compound, thereby enabling the ink to rapidly undergo gelation after landing onto the recording medium.

When comparison was made between inks 1 to 11, 13 to 15, 18 to 20, and 23 where the content of the crystalline polyester resin was higher than the content of the wax and inks 12, 16 and 17 where the content of the crystalline polyester resin was lower than the content of the wax, inks 1 to 11, 18 to 20 and 23 were less in leakage of the actinic radiation polymerizable compound from a dot formed. The reason is considered because the crystalline polyester resin can sufficiently form a crystal structure in a dot formed.

When comparison was made between inks 13 to 20 where the styrene acrylic-modified polyester resin was used as the crystalline polyester resin and inks 1 to 12 and 23 where an unmodified crystalline polyester resin was used, inks 13 to 20 were favorable with respect to both evaluation of leakage and evaluation of satellite properties. The reason is considered because not only the actinic radiation polymerizable compound can be confined in a steric structure formed by an aromatic ring derived from a styrene-based monomer, but also the actinic radiation polymerizable compound can be more suitably trapped by a constituent unit from a (meth) acrylic acid-based monomer high in affinity with the actinic radiation polymerizable compound.

The leakage was more observed in inks 12, 16, and 17 when the recording medium was a PET film than when the recording medium was a PP film or a PFA film. The reason is considered because the amount of the wax compounded is larger than the amount of the crystalline polyester resin compounded, in ink 12, and thus the crystalline polyester resin cannot sufficiently form a crystal structure in a dot formed.

Inks 4 to 10 where the modification ratio of the styrene acrylic-modified polyester resin was 40 wt % or less provided favorable results in evaluation of leakage and evaluation of satellite properties. The reason is considered because a reduction in crystallinity of the crystalline polyester resin due to styrene acrylic modification can be restricted and thus the crystalline polyester resin can be sufficiently crystallized, resulting in more effective suppression of leakage of the actinic radiation polymerizable compound.

On the contrary, inks 21 and 22 including no crystalline polyester resin provided inferior results in evaluation of leakage and evaluation of satellite properties as compared other ink. The reason is considered because such inks include no crystalline polyester resin and thus no internal aggregation force of each of the inks is generated by affinity with the actinic radiation polymerizable compound included in each of the inks.

Ink 23 including crystalline polyester and amide gel caused leakage of the actinic radiation polymerizable compound from a dot formed to be much observed. Such an ink was inferior in pinning properties as compared with other inks. The reason is considered because the amide gel is high in polarity and thus is compatible with the actinic radiation polymerizable compound and the crystalline polyester resin, thereby causing crystallization to hardly occur on the recording medium after landing of the ink.

From the foregoing, an ink, which includes a styrene acrylic-modified polyester resin and wax low in polarity, thus can be provided which not only can allow the occurrence of leakage and satellites to be suppressed, but also has high pinning properties. Thus, a highly fine image can be formed on not only an absorbable medium such as paper, but also a non-absorbable medium such as a resin film.

INDUSTRIAL APPLICABILITY

The actinic radiation curable ink of the present invention not only enables satellites occurring in injection of the ink to be suppressed, but also hardly causes bleeding of the ink to occur, and thus an image with no variation can be formed. Thus, the present invention is expected to allow applications of the gel ink according to an inkjet method to be broadened, thereby contributing to progression and diffusion of the art in the field.

Although embodiments of the present invention have been described and illustrated in detail, the disclosed embodiments are made for purposes of illustration and example only and not limitation. The scope of the present invention should be interpreted by terms of the appended claims.

What is claimed is:

1. An actinic radiation curable inkjet ink, comprising:
    an actinic radiation polymerizable compound;
    a crystalline polyester resin alone; and
    a gelling agent selected from the group consisting of aliphatic ester-based wax, aliphatic ketone-based wax, paraffin wax and microcrystalline wax,
    wherein the crystalline polyester resin in the actinic radiation curable inkjet ink consists of a polycondensation resin of a polyvalent carboxylic acid compound and a polyhydric alcohol compound.

2. The actinic radiation curable inkjet ink according to claim 1, wherein the gelling agent is a gelling agent selected from the group consisting of aliphatic ester-based wax and aliphatic ketone-based wax.

3. The actinic radiation curable inkjet ink according to claim 1, wherein the aliphatic ester wax is wax having an ester group represented by the following formula (1), wherein $R_1$ and $R_2$ each independently represent a saturated or unsaturated hydrocarbon group having 17 to 25 carbon atoms $$R_1-(C=O)-O-R_2. \qquad \text{Formula (1)}$$

4. The actinic radiation curable inkjet ink according to claim 1, wherein the aliphatic ketone wax is wax having a ketone group represented by the following formula (2), wherein $R_3$ and $R_4$ each independently represent a saturated or unsaturated hydrocarbon group having 17 to 25 carbon atoms $$R_3-(C=O)-R_4. \qquad \text{Formula (2)}$$

5. The actinic radiation curable inkjet ink according to claim 1, wherein a content of the crystalline polyester resin based on a total mass of the actinic radiation curable ink is higher than a content of the wax based on the total mass of the actinic radiation curable ink.

6. The actinic radiation curable inkjet ink according to claim 1, wherein a content of the wax based on a total mass of the actinic radiation curable ink is 0.01 to 7.0 wt %.

7. The actinic radiation curable inkjet ink according to claim 1, wherein a content of the crystalline polyester resin based on a total mass of the actinic radiation curable ink is 0.1 to 10.0 wt %.

8. The actinic radiation curable inkjet ink according to claim 1, wherein the crystalline polyester resin is a styrene acrylic-modified polyester resin.

9. The actinic radiation curable inkjet ink according to claim 8, wherein a modification ratio of the styrene acrylic-modified polyester resin is 40 wt % or less.

10. The actinic radiation curable inkjet ink according to claim 1, wherein an HSP distance between the crystalline polyester resin and the actinic radiation polymerizable compound is 50 or less.

11. An image forming method comprising:
- ejecting the actinic radiation curable inkjet ink according to claim 1 heated to 40 to 120° C. through an inkjet head, to land the actinic radiation curable inkjet ink ejected, onto a surface of a recording medium or an intermediate transfer member whose surface temperature is 60° C. or less; and
- irradiating the actinic radiation curable inkjet ink landed with actinic radiation.

12. The image forming method according to claim 11, wherein
- the landing is to land the actinic radiation curable inkjet ink ejected, onto a surface of the intermediate transfer member; and
- the method comprises, between the landing and the irradiation, transferring the landed actinic radiation curable inkjet ink to a recording medium.

\* \* \* \* \*